H. Tyler,
Double-Acting Pump.
N° 70,379. Patented Oct. 29, 1867.
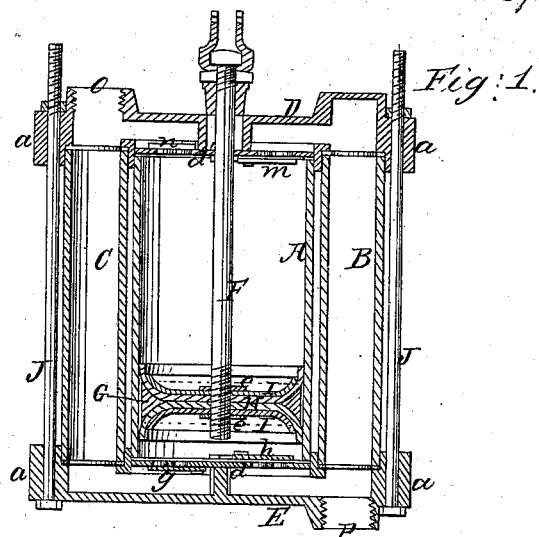
Fig. 1.
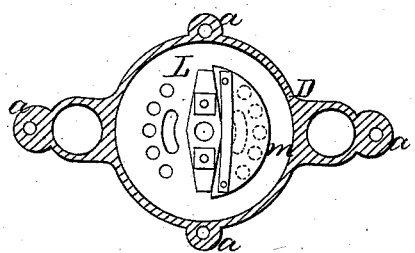
Fig. 2.
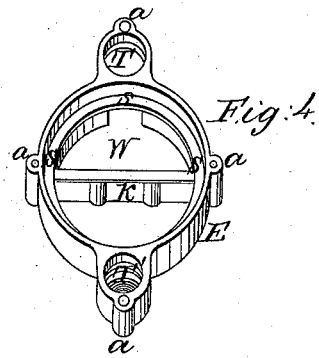
Fig. 3.
Fig. 4.
Witnesses;
A. A. Yeatman
A. N. Marr
Inventor:
Hiram Tyler.
Per.
Alexander & Mason
Attys.

United States Patent Office.

HIRAM TYLER, OF GAINES, NEW YORK, ASSIGNOR TO HIMSELF, CHARLES T. RICHARDS, OF ALBION, AND JOHN MARSH, OF EAST CARROLLTON, NEW YORK.

*Letters Patent No. 70,379, dated October 29, 1867.*

IMPROVEMENT IN PUMPS.

*The Schedule referred to in these Letters Patent and making part of the same.*

TO ALL WHOM IT MAY CONCERN:

Be it known that I, HIRAM TYLER, of Gaines, in the county of Orleans, and in the State of New York, have invented certain new and useful Improvements in Pumps; and do hereby declare that the following is a full, clear, and exact description thereof, reference being had to the accompanying drawings, and to the letters of reference marked thereon.

In the annexed drawings, making part of this specification, A represents a cylinder, and B and C represent two pipes which are placed one upon each side of it. D and E represent two cast metallic boxes, each having three annular openings to receive the ends of the cylinder, and the ends of the two pipes B and C; E being the bottom box, the lower end of cylinder A is placed upon it in its centre openings, and the bottoms of the pipes B and C are placed in the openings upon each side of it, as seen. The upper box D is placed so as to cover the upper ends of the cylinder and pipes, and rods J J being passed through ears formed on the four sides of these boxes, and nuts being passed over the ends of these rods, the two boxes are clamped tight against the cylinder and pipes C and B. Each of the boxes has a partition, K, cast crosswise of it, dividing the centre opening, for the end of the cylinder, in two parts; W representing, in fig. 4, the opening which is divided. The chambers upon each side of partition K connect with the openings T and T', which receive the ends of the pipes. The openings in these boxes, which receive the ends of the cylinder and pipes, are formed with seats, upon which packing may be placed to make a close joint. Upon the seat S of opening W I first place a valve-plate, L, and upon this plate I place the packing-ring. The plates L rest not only upon the seat S, but also upon the partition K, and said plates are provided with perforations upon each side of the partition, and these perforations are covered with flap-valves $g\ d\ m\ n$. Upon each of these plates the valves are so arranged that one opens upward and the other downward. F represents a piston-rod, which is provided, upon its lower end, with a piston-head, constructed as follows: I use an annular ring, made of metal, which is fitted loosely within the cylinder. This ring is bevelled inward from each edge of its periphery, so that it is V-shaped on its inside, as represented. H represent two leather plates or disks, which are made larger in diameter than the diameter of the cylinder. These disks are placed upon each side of the ring, and two metallic cups I I are placed, with bottoms inward, against the disks H. $e\ e$ represent nuts, which fit over the thread upon the lower end of the piston-rod, and serve to bind the cups tightly against the disks H, and the ring G binding the several parts together, and the head thus formed to the piston-rod. The piston-rod may be packed in any of the known and usual ways where it enters the cylinder.

In using this pump I attach a pipe at the orifice P, which passes down to the water of the well. A pipe passes up from orifice O, to the top of the well, to deliver the water. It will be seen that after the piston-head has been pushed down to the bottom of the cylinder, so as exclude the air as it is being drawn up, the valve $h$ rises, and the water, passing up through orifice P in the lower box, fills the cylinder beneath the cylinder-head as fast as said head rises. When the piston-head descends, water passes up pipe B, and through valve $m$, into the cylinder, following the head down and filling the cylinder above the head. As the piston-head begins to descend the valve $g$ opens, and the water from beneath the head is forced up pipe C and out through orifice O. When the head ascends again the water is received in below it, as has been described, through valve $h$, and the water above it is forced out through valve $n$ and into or through orifice O. Thus at each down stroke water is received into the cylinder above the head, and discharged from it below the head, while at each upward stroke the reverse is the case, the water being received below and discharged above. I may submerge this pump, closing the port or orifice P, and perforating the side of pipe B, or making an opening to it through the upper box to allow the water to enter. A strainer can be used for excluding any impurity in the water.

Having thus fully described my invention, what I claim as new, and desire to secure by Letters Patent, is—

The boxes D and E, pipes B C, valve-plates L, and piston-head as constructed with its piston-rod F, the several parts being used with the cylinder A, when combined, arranged, and operating in the manner substantially as and for the purposes herein specified.

In testimony that I claim the foregoing I have hereunto set my hand this 20th day of June, 1867.

HIRAM TYLER.

Witnesses:
C. M. ALEXANDER,
J. M. MASON.